Figure 2:
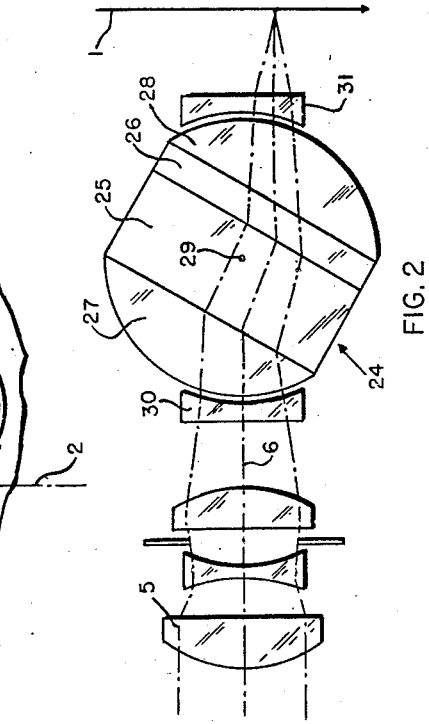

Nov. 6, 1956  G. SCHWESINGER  2,769,367

DEVICE FOR COMPENSATING OPTICAL IMAGE MOTION

Filed June 27, 1952

INVENTOR.
GERHARD SCHWESINGER
BY
Harry M. Saragovitz
Attorney

United States Patent Office 2,769,367
Patented Nov. 6, 1956

2,769,367

DEVICE FOR COMPENSATING OPTICAL IMAGE MOTION

Gerhard Schwesinger, Little Silver, N. J., assignor to the United States of America as represented by the Secretary of the Army Application June 27, 1952, Serial No. 296,103

2 Claims. (Cl. 88—16.8)

(Granted under Title 35, U. S. Code (1952), sec. 266)

The invention described herein may be manufactured and used by or for the Government for governmental purposes without the payment of any royalty thereon.

This invention relates to an optical system for taking motion pictures on conventional motion picture film and is also adapted for projecting the picture from the film strip after it has been processed. The invention is particularly directed to taking or projecting high quality moving pictures in an apparatus designed to feed the film therethru continuously in distinction to the conventional type of apparatus wherein the film strip is fed intermittently from one frame to the next.

To produce a motion picture which presents a normal reproduction of the subject upon a screen while the film strip moves uninterruptedly requires the introduction of a compensating device to control the beam of light at a position between the image forming lens and the film. There have been many types of compensating devices proposed each having undesirable qualities tending to degrade the accuracy of reproduction. The present invention provides means for correcting the major aberrations encountered in the use of such compensating divces. The principal aberrations are nonlinear image shift, coma and astigmatism.

In prior compensating devices of the nature above suggested a major effort has been directed to the correction of nonlinear image shift. Prior efforts to reduce coma and astigmatism have been based upon corrective measures requiring reduction in lens aperture. The present invention provides means for correcting all three of the above mentioned aberrations to a relatively high degree of perfection and without a consequent reduction in lens aperture.

Prior to the present invention it had appeared that no practical optical means could be devised for reducing all three of the aberrations inherent in compensating devices employing rotating plane parallel faced elements. In the development of the invention it was determined that certain factors only could contribute to a direct solution of the problem. It became apparent from an examination of the mathematical expressions, which indicate the various aberrations involved, that substantially all of the quantities are inherently and unchangeably positive in nature. The one exception to the inflexibility of the quantities is that of the parameters denoting the refractive indices of the elements in the compensating device. It was determined that if the index of refraction of one of the refracting elements is greater than one and that of a second refracting element is less than one it is possible to design a system in which the aberrations mentioned are greatly reduced. A more comprehensive statement of the reasons leading to the above premise will appear hereinafter.

Prior to the present invention such correction could not be achieved because there is no known nonabsorbing refractive substance having an index of refraction less than one. The present invention embodies the development of an optical system which achieves a result equivalent to a system in which refractive elements have indices of refraction greater than one and less than one respectively.

It is a primary object of the invention to provide means for substantially reducing the major aberrations involved in an optical compensator of the type above suggested.

A further object of the invention is to provide a compensating device which requires no mechanism in addition to that required by the same device without the correcting elements involved in the present invention.

A further object of the invention is to provide the means with which to calculate and design optical corrective elements to insure high quality recording of a picture or for projection thereof from a continuously moving film strip.

A further object of the invention is to take or project motion pictures without interrupting the image beam and while admitting the total light energy passed by the full lens aperture.

Other objects and features of the invention will more fully appear from the following specification and will be particularly pointed out in the claims.

Figure 1:
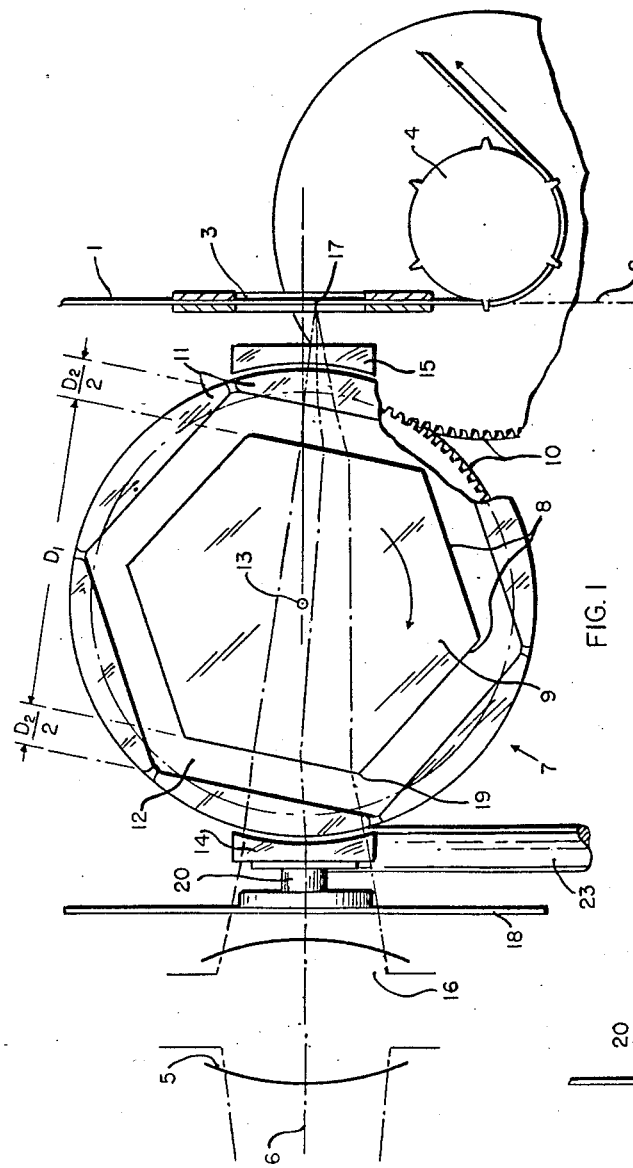
Figure 3:
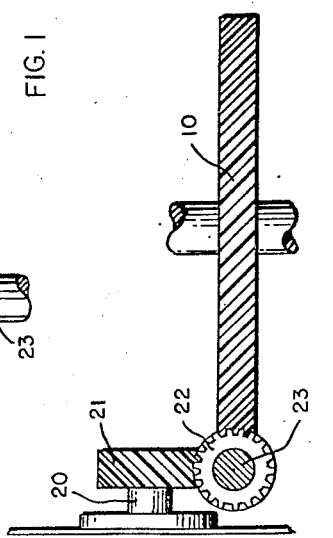

To provide a better understanding of the invention specific embodiments thereof will be described herein in connection with the accompanying drawings in which Fig. 1 is a diagrammatic view of a preferred embodiment of the invention and Fig. 2 is a diagrammatic view of a modified form thereof and Fig. 3 is a detail view illustrating a portion of the driving means for the device.

The desirability of producing a successful motion picture camera and projector employing the principles of the invention has long been recognized but has never been realized. Such a system is desirable because the mechanism involved is relatively simple, efficient and quiet in operation as compared to a conventional intermittent film feeding device. Moreover in a continuous feed mechanism the life of the film is considerably extended because of the reduced amount of wear on the film perforations.

The present invention is directed to a particular type of compensating device including a rotating prismatic element located between the image forming lens and the film strip constituting the taking or projecting system. In compensating devices of this general type the abberations previously mentioned are present and many unsuccessful attempts have been made to correct them.

Referring to the drawing Fig. 1 shows schematically an optical system embodying the invention wherein the conventional film strip 1 is guided in any suitable manner in the focal plane 2 of the system and adjacent to the film gate 3. The film is driven in any suitable manner at constant speed such as by means of a sprocket 4 which engages the film perforations. A lens 5 is provided for forming the image and when the invention is employed as a projector a suitable light source is provided for illuminating the gate 3. A compensator indicated generally at 7 is interposed in the path of the light passing between the film and the lens.

The compensator is rotated in the proper direction and at a speed synchronized with the speed of travel of the film. The speed of the compensator is fixed by the number of pairs of parallel faces 8 upon the glass prism 9. The timing of the mechanism must be such that one frame of the film strip must pass the gate 3 each time a pair of faces on the prism passes thru its active cycle. A more complete description of the action of the compensator will be set forth hereinafter.

Any suitable means may be used for insuring correct timing action between the compensator and the speed of travel of the film. Such a timing means may be a conventional train of gears 10 between the compensator shaft and the film feeding member.

The foregoing brief description has set forth the general construction of the type of compensator involved in applicant's invention, namely a compensator which includes a revolving prismatic element having correct thickness and an homogeneous refractive index of the correct magnitude to control the formation of the picture as above described.

Such a prism introduces aberrations in the image thruout its operating cycle. Prior to the present invention it has been impossible to reduce these aberrations below a certain desirable minimum without reducing the lens aperture. The present invention greatly reduces these aberrations in the following manner. The single element compensator is replaced by a double element device. The double element refracting device may have various forms, but in each case the two portions thereof must have different indices of refraction. In the text immediately following, which is used in connection with certain formulas, the refracting device considered is composed of two plates having parallel faces and secured together face to face. Formulas for the aberrations produced by rotating parallel faced elements were, for example, presented by J. Kudar, Optical Problems of Rotating Prisms in Cinematograph Projectors. Proceedings of Physical Society (London) Vol. 58 Sept. 1946 page 598. From these formulas it appears that coma and astigmatism increase in proportion to a factor M the equation for this quantity is $$M = PQD \qquad (1)$$

where $$P = \frac{n-1}{n} \qquad (2)$$

$$Q = \frac{n+1}{n^2} \qquad (3)$$

and where D denotes the thickness of the prismatic element.

The nonlinear lateral image shift on the other hand increases in proportion to a factor $$K = P\left(Q - \frac{1}{3}\right)D \qquad (4)$$

The total amount of coma and astigmatism produced by a compensator composed of two plates whose characteristics will be designated by the subscripts 1 and 2 respectively; increase in proportion to a factor $$M = P_1 Q_1 D_1 + P_2 Q_2 D_2 \qquad (5)$$

The resulting lateral nonlinear image shift is given by $$K = P_1\left(Q_1 - \frac{1}{3}\right)D_1 + P_2\left(Q_2 - \frac{1}{3}\right)D_2 \qquad (6)$$

It should be noted that the quantities Q and D are positive for both plates. In order to correct the aberration under consideration it is necessary to reduce quantities M and K to as small a value as possible. Vanishing values of M or K can be obtained only by making negative one of the two additive terms, of which M and K respectively are composed, and equal to the absolute value of the remaining positive term. This in turn requires that one of the refractive indices for example $n_2$ is less than unity so that $P_2$, becomes negative. A nonabsorbing material of this property does not exist but the foregoing requirement can nevertheless be fulfilled in an indirect manner.

An optical system which fulfills the desired requirements is shown in Fig. 1. In such a system the number of the pairs of parallel polygon sides 8 is arbitrary. In the drawing three pairs of parallel sides are shown which results in the formation of a symmetrical solid prism of hexagonal cross section.

In the practice of the invention certain elements are used in conjunction with the prism 9. For each pair of faces 8 a pair of plano convex lenses 11 are provided which are permanently mounted with their plano faces facing, parallel to and spaced from each prism face thereby to provide equal air spaces 12 between the prism face and the lens. The air spaces 12 constitute one element of the double element refractor, each space having a value $$\frac{D_2}{2}$$

While the prism 9 has a thickness $D_1$. Each of the six faces of the prism have an identical cooperating lens 11 fixed in position with respect to the prism faces in the manner above described. The centers of curvature of all the lenses 11 coincide with axial lines drawn normal to the faces 8 and passing thru the axis of rotation 13 about which the assembled element 7 rotates. The convex faces of the lenses 11 all have a curvature equal to the axial distance therefrom to the axis 13. The curvature of the external faces of the six lenses 11 thus conform to a circle having its center at the axis 13.

The assembly 7 is desirably secured to one of the gears in the gear train 10 and the mechanism is driven in any suitable manner at a speed suitable to the subject matter being portrayed. In this connection it should be pointed out that a projector or a camera embodying the invention is particularly adapted to operation at high speed since there is no necessity for a complicated intermittent reciprocating mechanism which is used in conventional motion picture systems.

In addition to the rotating element 7 the invention provides a pair of stationary plano concave lenses 14 and 15 positioned with their centers of curvature upon the axis 6 coinciding with the axis of the lens 5 and the center of the film gate and with their concave faces closely adjacent to the convex faces of the lenses 11. The spacing should be just sufficient to permit the member 7 to rotate without touching the lenses 14 and 15. The curvature of the plano concave lenses is determined by the radius therefrom to the axis 13. In other words the centers of the spherical surface of all the lenses above described coincide at the axis 13.

The group of lenses 11, 14 and 15, it will be shown, have not effect on the lateral image displacement but do provide the means whereby the necessary condition is achieved wherein the compensator be composed of elements which have an effect equivalent to that which would be provided by a compensator having one element whose index of refraction is greater than one and another element whose index or refraction is less than one.

Considering now the effect of the above group of lenses upon the lateral shift of the image beam 16, attention is directed to the action of adjacent lenses 11 and 14 which considered together form a wedge which varies its angle as the member 7 rotates. An identical variable wedge is also formed by adjacent lenses 11 and 15. The refractive indices of the lenses are the same and will be designated $N_0$.

In operation when the wedge formed by lenses 11 and 14 is increasing its angle the wedge formed by the lenses 11 and 15 is increasing its angle at the same rate. Consequently the beam displacing effect of the two variable wedges cancels out and therefore has no effect on the lateral displacement of the image. Only the tilted prisms in conjunction with the air spaces 12 produce the required image shift.

From the above it will be apparent that the relative refractive indices which determine the magnitude of the image shift are respectively $$n_1 = N_1/N_0$$

(where $N_1$ designates the refractive index of the prism 9)

$$n_2 = 1/N_0$$

It appears from the second expression that $n_2$ is in fact, a quantity smaller than unity as required. Since $n_2$ is smaller than one, $n_1$ should be greater than one. Consequently the prism 9 should be made of a highly refracting material so that $N_1$ is substantially greater than $N_0$. It appears from inspection of equations 5 and 6 that M and K cannot be reduced to 0 at the same time, however, if one of their quantities vanishes the other one assumes a very small value which means that a correction of astigmatism and coma automatically tends to reduce nonlinear image shift.

Conversely the correction of nonlinear image shift reduces essentially all astigmatism and coma.

When the compensator is to be used with a relatively small lens aperture, coma and astigmatism are inherently reduced by use of a small lens opening, therefore particular attention can be directed to correction of nonlinear image shift. On the other hand at larger lens apertures more attention should be directed to the correction of the coma and astigmatism.

In the same sense that uncorrected compensators may use a shutter so may the present invention be used in connection with a shutter. One such application is shown in Fig. 1 of the drawings wherein a rotating disc 18 is positioned to interrupt the light beam at a point between the lens 5 and the compensator 7. The shutter may serve to increase the flicker frequency of the system or it may be designed to cut off the light beam for a small portion only of a cycle embracing a change from one frame to another on the film strip. This interruption should occur during the period when the junction point 19 between adjacent faces of the prism is just entering the image beam as shown in Fig. 1. In this way any small residual aberration could be practically eliminated if necessary. The shutter may be driven in any suitable manner such as that illustrated in Fig. 1 wherein it is mounted on a shaft 20 which is offset from and parallel to the optical axis 6. The blades of the shutter traverse the light beam and serve to interrupt the light as above indicated. The shaft 20 desirably is provided with a spiral toothed gear 21 shown in Fig. 3 which in turn is driven by an intermeshing spiral gear 22 which may desirably be mounted directly on the shaft 23 of a constant speed motor not shown. This drive may be extended to the compensator 7 and the sprocket 4. This may be done by intermeshing the gear 22 with the gear 10 on the prism. Thus all driving units are maintained in positive timed relation.

It should be pointed out that satisfactory operation of the device may be obtained without the use of a shutter.

Referring to the drawing a slightly different form of invention is shown in Fig. 2. This form of the invention functions upon exactly the same principles as the device illustrated in Fig. 1. The difference between the two is found in the structure of the rotating compensator element. The rotating element 24 is composed of a pair of glass plates 25 and 26 held in contact with each other in any suitable manner and having respectively a thickness $D_1$ and $D_2$ and refractive indices $N_1$ and $N_2$. The plane face of a pair of plano convex lenses 27 and 28 are secured to the outer face of the plates 25 and 26 thus forming a rotatable unit similar to the prism assembly shown in Fig. 1. The convex face of the lenses 27 and 28 have a curvature equal to the radius therefrom to the axis of rotation 29.

To establish the variable wedge function described in connection with Fig. 1 a pair of plano convex lenses 30 and 31 are fixed in position with their centers of curvature upon the axis 6 and with their concave faces closely adjacent to the convex faces of the lenses 27 and 28 in the same manner as the lenses 14 and 15 are coordinated in the structure shown in Fig. 1.

The glasses used in this form of invention are chosen to have the same characteristics as in the other form of the invention and the lenses 27, 28, 30 and 31 have an index of refraction $N_0$ while the plate 25 has an index of refraction $N_1$ and the plate 26 an index of $N_2$ where $N_2 < N_0 < N_1$.

The compensator shown in Fig. 2 functions in connection with the lens 5 and the film strip 1 and its refracting elements are designed to have effective indices of refraction respectively greater and less than one.

Correction of the whole system, with respect to spherical aberration has not been considered in connection with the invention because it is realized that such spherical errors introduced by the compensating device are of such a nature that they could be adequately corrected by designing the projecting lens itself to cancel out such aberrations.

Thruout the foregoing description the lenses referred to have been of the spherical type and such lenses function in a satisfactory manner. The invention is however not restricted to the use of spherical lenses in the compensator. Accurately formed cylindrical lenses may be used and if so used the same high degree of correction may be obtained as with the use of spherical lenses.

What is claimed is:

1. An image motion compensator for eliminating optical aberrations comprising at least two plane-parallel refracting elements of two different refractive indices, said elements being arranged in abutting relationship along the optical axis of the compensator and being rotatable as a unit about an axis perpendicular to and lying on the optical axis of the compensator to provide a two-element rotating refractor for refracting an image forming light beam, a two-element variable optical wedge disposed on each opposite side of said rotating refractor along said optical axis in position to pass said image forming light beam, each of said wedges comprising a movable plano convex lens, the convex surface of which lies on a circle having its center on the axis of rotation of said tilting refractor, each of said wedges further comprising a fixed plano concave lens, the concave surface of which lies on a circle whose radius is substantially equal to the radius of said first-mentioned circle and whose center coincides with the center of said first-mentioned circle, the refractive index of each of said lenses being the same but different from the refractive indices of said rotating refractor, the refractive index of one element of said two-element refractor being substantially greater than the refractive index of said lenses and the refractive index of the other element of said refractor being less than the refractive index of said lenses, means for rotating said refractor and said movable lenses in synchronism, said variable optical wedges refracting said image beam in opposite directions whereby the result of refraction by said wedges and by said refractor is a lateral displacement of said image beam, said wedges further providing a medium embracing said tiltable refractor having a refractive index with respect to which one element of said refractor has a relative index of refraction greater than unity and with respect to which the other element of said refractor has a relative index of refraction less than unity.

2. An image motion compensator for eliminating optical aberrations comprising a glass prism having a number of pairs of flat parallel faces, said prism being rotatable about an axis perpendicular to and lying on the optical axis of said compensator, a like number of pairs of plano convex lenses permanently mounted for rotation as a unit with their plane faces facing, parallel to and spaced from each prism face to provide equal air spaces between each prism face and each lens, said prism and air spaces providing a rotatable refractor, the convex surfaces of said lenses lying on the circumference of a circle whose center lies on the axis of rotation of said glass prism, a pair of stationary plano concave lenses positioned with their centers of curvature lying upon the said optical axis and with their concave faces lying upon the circumference of a circle whose radius is substantially equal to the radius of said first-mentioned circle, the index of refraction of each of said lenses being the same, the index of refraction of said glass prism being substantially greater than the index of refraction of said lenses, means for rotating said prism and said plano convex lenses in synchronism, said pair of plano concave lenses and the pair of plano convex lenses passing through the optical axis during rotation forming a pair of variable optical wedges refracting said image beam in opposite directions, said image beam being further refracted by the pair of flat parallel faces of said rotating prism then passing through said optical axis and the corresponding air spaces between each prism face and each plano convex lens, the result of said refractions being a lateral displacement of said image beam, said last-mentioned pairs of plano concave and plano convex lenses providing a medium embracing said prism and said air spaces having a refractive index with respect to which the glass prism has a relative index of refraction greater than unity and with respect to which said air spaces have a relative index of refraction less than unity.

References Cited in the file of this patent

UNITED STATES PATENTS

| | | |
|---|---|---|
| 2,417,002 | Leventhal | Mar. 4, 1947 |
| 2,417,076 | Hickman | Mar. 11, 1947 |

FOREIGN PATENTS

| | | |
|---|---|---|
| 322,465 | Germany | June 30, 1920 |
| 768,714 | France | May 28, 1934 |
| 682,221 | Germany | Oct. 10, 1939 |
| 52,866 | France | June 19, 1944 |
| | (First addition to No. 892,192) | |